(12) United States Patent
Laurenzo

(10) Patent No.: US 9,840,296 B2
(45) Date of Patent: Dec. 12, 2017

(54) THEFT DETERRENT APPARATUS

(71) Applicant: Michael Laurenzo, Chatsworth, GA (US)

(72) Inventor: Michael Laurenzo, Chatsworth, GA (US)

( * ) Notice: Subject to any disclaimer, the term of this patent is extended or adjusted under 35 U.S.C. 154(b) by 57 days.

(21) Appl. No.: 15/065,928

(22) Filed: Mar. 10, 2016

(65) Prior Publication Data

US 2016/0264198 A1    Sep. 15, 2016

Related U.S. Application Data

(60) Provisional application No. 62/131,724, filed on Mar. 11, 2015.

(51) Int. Cl.
*F16B 39/02* (2006.01)
*B62J 11/00* (2006.01)
(Continued)

(52) U.S. Cl.
CPC ............. *B62J 11/00* (2013.01); *F16B 37/043* (2013.01); *F16B 39/02* (2013.01); *F16B 39/24* (2013.01);
(Continued)

(58) Field of Classification Search
CPC ...... F16B 37/041; F16B 37/044; F16B 39/02; F16B 39/24; B62J 11/00; B60R 9/10; B60R 2011/0052; B60R 2011/0096
(Continued)

(56) References Cited

U.S. PATENT DOCUMENTS 2,184,252 A  *  12/1939  Garrett .................... F16B 39/24
                                                          411/152
2,553,739 A  *   5/1951  Ashdowne ................ B62J 9/00
                                                          224/413
(Continued)

FOREIGN PATENT DOCUMENTS

EP          1305142         12/2001

OTHER PUBLICATIONS

Winco, Fluted hand knobs, found online, Feb. 27, 2015, http://www.jwwinco.com/products/section8/fkzsfindex.html.
(Continued)

*Primary Examiner* — Roberta S Delisle
(74) *Attorney, Agent, or Firm* — Crose Law LLC; Bradley D. Crose

(57) ABSTRACT

A mounting hardware and theft deterrent device includes a hand knob; a threaded screw coupled to the hand knob; a U-clip configured to replace a stock retaining clip on a motorcycle frame and for placement on the motorcycle frame to receive the threaded screw coupled to the hand knob and thereby to secure a motorcycle saddlebag to the motorcycle; and a lock washer for placement over the threaded screw coupled to the hand knob before the threaded screw is inserted into the U-clip. The hand knob, threaded screw fixedly coupled to an underside surface of the hand knob, U-clip, and lock washer collectively form the theft deterrent device. The theft deterrent device is configured for utilization to secure a motorcycle saddlebag to a motorcycle frame without a need for any additional installation tools. The theft deterrent device includes a retaining clip to hold the hand knob to the motorcycle saddlebag.

20 Claims, 12 Drawing Sheets

(51) Int. Cl.
   *F16B 39/24*    (2006.01)
   *F16B 37/04*    (2006.01)
   *F16B 41/00*    (2006.01)
   *F16B 43/00*    (2006.01)
   *F16B 35/06*    (2006.01)

(52) U.S. Cl.
   CPC ............ *F16B 41/005* (2013.01); *F16B 43/00* (2013.01); *F16B 35/06* (2013.01)

(58) Field of Classification Search
   USPC .......... 411/174, 175, 409, 970; 16/414, 417, 16/430, 433, DIG. 30; 224/412, 413, 535
   See application file for complete search history.

(56) References Cited

U.S. PATENT DOCUMENTS

| | | | |
|---|---|---|---|
| 2,783,927 A | 3/1957 | Harley | |
| 4,729,706 A * | 3/1988 | Peterson | F16B 37/041 411/112 |
| 6,318,924 B1 | 11/2001 | Schiavo, Jr. | |
| 6,357,980 B1 | 3/2002 | Lansinger | |
| 6,499,638 B2 * | 12/2002 | Campbell | B62J 9/001 190/18 A |
| 6,520,275 B2 * | 2/2003 | Galbraith | B62J 9/00 180/219 |
| 6,575,344 B2 * | 6/2003 | Nusbaum | B60R 9/048 224/525 |
| 6,619,522 B2 | 9/2003 | Schurr | |
| 6,793,110 B2 * | 9/2004 | Hamilton | B62J 9/00 224/413 |
| 7,311,232 B2 * | 12/2007 | Watanabe | B62J 9/001 224/413 |
| 2004/0164113 A1 * | 8/2004 | Thomas | B62J 9/00 224/413 |
| 2005/0104305 A1 * | 5/2005 | Chan | B60R 9/10 280/7.11 |
| 2005/0150921 A1 * | 7/2005 | Schneider | B62J 9/00 224/413 |
| 2006/0163302 A1 * | 7/2006 | Knoch | B62J 9/001 224/413 |
| 2007/0101780 A1 * | 5/2007 | Sanders | B62J 9/00 70/233 |
| 2007/0224018 A1 * | 9/2007 | DePerro | F16B 37/044 411/175 |
| 2008/0083801 A1 * | 4/2008 | Knoch | B62J 7/08 224/413 |
| 2011/0315728 A1 * | 12/2011 | Ghormley | B62J 9/00 224/413 |
| 2014/0291367 A1 | 10/2014 | Colano | |

OTHER PUBLICATIONS

Brukus, SaddlebagSecure, found online, Feb. 27, 2015, http://brukus.com/cgi-bin/p/awtp-product.cgi?d=brukus-motorcycle-parts&item=40986.

* cited by examiner

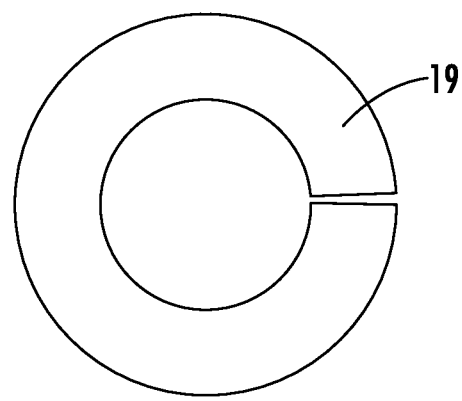
FIG. 4A
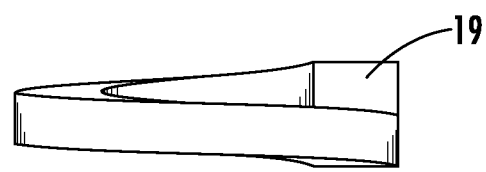
FIG. 4B
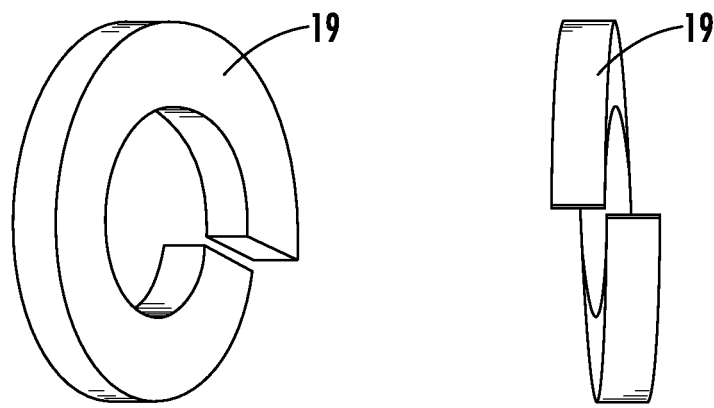
FIG. 4C  FIG. 4D

THEFT DETERRENT APPARATUS

CROSS-REFERENCE TO RELATED APPLICATION(S)

The present non-provisional patent application claims the benefit of priority of U.S. Provisional Patent Application No. 62/131,724, which is entitled ""LOCEZY" MOUNTING HARDWARE/SECURITY THEFT DETERRENT SYSTEM FOR HARLEY DAVIDSON MOTORCYCLE SADDLEBAGS", which was filed on Mar. 11, 2015, and which is incorporated in full by reference herein.

FIELD OF THE INVENTION

The technology described herein relates generally to theft deterrent systems and devices and motorcycle saddlebags. More specifically, this technology relates to an improved apparatus and mounting and theft deterrent system for a motorcycle saddlebag. Additionally, this technology relates to a method for retrofitting a motorcycle with the mounting hardware apparatus and theft deterrent system.

BACKGROUND OF THE INVENTION

Motorcycles often include saddlebags in which to carry the personal gear of the rider, repair equipment and tools, raingear, and so forth. By way of example, saddlebags can be mounted to one or more brackets, or the like, attached to the motorcycle frame. Saddlebags can be mounted, for example, to the rear of the rider's seat, and can be on more than one side of the motorcycle. Saddlebags can be made of various materials such as leather, fiberglass, and so forth.

There are various mounting devices, systems, and methods that are utilized to couple a saddlebag to a motorcycle. However, there are numerous deficiencies and shortcomings in the known mounting devices, systems, and methods that are utilized to couple a saddlebag to a motorcycle.

Related utility patents and published patent applications known in the art include the following:

U.S. Pat. No. 6,619,522, issued to Schurr on Sep. 16, 2003, discloses a motorcycle golf bag carrier.

U.S. Pat. No. 2,783,927, issued to Harley on Mar. 5, 1957, discloses luggage carriers for cycles.

U.S. Pat. No. 6,378,643, issued to Galbraith et al. on Apr. 30, 2002, discloses a motorcycle saddlebag mounting system.

U.S. Pat. No. 7,278,560, issued to Aron on Oct. 9, 2007, discloses a motorcycle saddlebag mounting system and apparatus.

U.S. Pat. No. 7,311,232, issued to Watanabe et al. on Dec. 25, 2007, discloses a motorcycle saddlebag mounting device.

U.S. Pat. No. 6,293,450, issued to Aron on Sep. 25, 2001, discloses a quick release mechanism for a motorcycle saddlebag.

U.S. Patent Application Publication No. 2014/0291367, filed by Colano and published on Oct. 2, 2014, discloses a saddlebag removal assembly and system.

Related non-patent literature known in the art include the following:

J. W. Winco, Inc. discloses in its online store a fluted hand knob, http://www.jwwinco.com/products/section8/fkzs/index.html.

Brukus® Motorcycle Parts discloses in its online store a product called SaddlebagSecure, http://brukus.com/cgi-bin/p/awtp-product.cgi?d=brukus-motorcycle-parts&item=40986.

The foregoing patent and other information reflect the state of the art of which the inventor is aware and are tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides an improved apparatus and mounting and theft deterrent system for a motorcycle saddlebag. Additionally, this technology relates to a method for retrofitting a motorcycle with the mounting hardware apparatus and theft deterrent system.

In one exemplary embodiment, the technology described herein provides a mounting hardware and theft deterrent device. The theft deterrent device includes: a hand knob; a threaded screw fixedly coupled to an underside surface of the hand knob; a U-clip configured to replace a stock retaining clip on a motorcycle frame and configured for placement on the motorcycle frame to receive the threaded screw coupled to the hand knob and thereby to secure a motorcycle saddlebag to the motorcycle; and a lock washer configured for placement over the threaded screw coupled to the hand knob before the threaded screw is inserted into the U-clip. The hand knob, threaded screw fixedly coupled to an underside surface of the hand knob, U-clip, and lock washer collectively form the theft deterrent device.

In at least one embodiment, the theft deterrent device all includes a retaining clip configured for placement over the threaded screw and configured to hold the hand knob to the motorcycle saddlebag when the motorcycle saddlebag is removed from the motorcycle.

In at least one embodiment, the theft deterrent device is configured for utilization to secure a motorcycle saddlebag to a motorcycle frame without a need for any additional installation tools.

In at least one embodiment of the theft deterrent device, the hand knob comprises a fluted hand knob.

In at least one embodiment of the theft deterrent device, the hand knob comprises a plurality of fingers grips.

In at least one embodiment of the theft deterrent device, the hand knob comprises a receptacle for the threaded screw on a backside of the hand knob.

In at least one embodiment of the theft deterrent device, the hand knob comprises a receptacle for the threaded screw on a backside of the hand knob, and the receptacle is $5/16$ of an inch in diameter.

In at least one embodiment of the theft deterrent device, the threaded screw comprises a socket head cap screw.

In at least one embodiment of the theft deterrent device, the threaded screw comprises a stud having a length of 1.25 inches.

In at least one embodiment of the theft deterrent device, the threaded screw comprises a stud having a length of 1.5 inches.

In at least one embodiment of the theft deterrent device, the threaded screw comprises a black-oxide alloy steel having a strength of stronger than Grade 8 steel screws.

In at least one embodiment of the theft deterrent device, the U-clip comprises spring steel and a diameter of $5/16$ inches and configured to receive a threaded screw having a diameter of $5/16$ inches.

In at least one embodiment of the theft deterrent device, the lock washer comprises a split lock washer and a diameter of 5/16 inches and configured to receive a threaded screw having a diameter of 5/16 inches.

In yet another exemplary embodiment, technology described herein provides a motorcycle saddlebag theft deterrent system and mounting hardware. The motorcycle saddlebag theft deterrent system includes: a motorcycle having a motorcycle frame upon which motorcycle saddlebags are attached; a hand knob; a threaded screw fixedly coupled to an underside surface of the hand knob; a U-clip configured for placement on the motorcycle frame to receive the threaded screw coupled to the hand knob and thereby to secure a motorcycle saddlebag to the motorcycle; and a lock washer configured for placement over the threaded screw coupled to the hand knob before the threaded screw is inserted into the U-clip.

In at least one embodiment of the motorcycle saddlebag theft deterrent system, the system includes a retaining clip configured for placement over the threaded screw and configured to hold the hand knob to the motorcycle saddlebag when the motorcycle saddlebag is removed from the motorcycle.

In at least one embodiment of the motorcycle saddlebag theft deterrent system, the hand knob comprises a fluted hand knob, a plurality of fingers grips, and a receptacle for the threaded screw on a backside of the hand knob.

In at least one embodiment of the motorcycle saddlebag theft deterrent system, the threaded screw comprises a socket head cap screw; and wherein the threaded screw comprises a stud having a length within the range of 1.25 inches to 1.5 inches.

In at least one embodiment of the motorcycle saddlebag theft deterrent system, the U-clip comprises spring steel and a diameter of 5/16 inches and configured to receive a threaded screw having a diameter of 5/16 inches, and the lock washer comprises a split lock washer and a diameter of 5/16 inches and configured to receive a threaded screw having a diameter of 5/16 inches.

In yet another exemplary embodiment, the technology described herein provides a method for securing a motorcycle saddlebag to a motorcycle by retrofitting the motorcycle with a theft deterrent device. The method includes: utilizing a theft deterrent device comprising: a hand knob; a threaded screw fixedly coupled to an underside surface of the hand knob; a U-clip configured to replace a stock retaining clip on a motorcycle frame and configured for placement on the motorcycle frame to receive the threaded screw coupled to the hand knob and thereby to secure a motorcycle saddlebag to the motorcycle; and a lock washer configured for placement over the threaded screw coupled to the hand knob before the threaded screw is inserted into the U-clip; opening a saddlebag lid; removing any existing saddlebag quick-release pins; removing a saddlebag; remove any existing stock-retaining clips; installing a U-clip on a motorcycle frame where the stock retaining clip was previously located; repeating the above method steps for each removed stock retaining clip; reinstalling the saddle bag; sliding a lock washer on the threaded screw fixedly coupled to an underside surface of the hand knob; sliding an original flat washer from the original bailhead quick release pin on the threaded screw fixedly coupled to an underside surface of the hand knob; inserting the threaded screw through a rubber grommet and into the U-clip; tightening the hand knob; and repeating the above steps for any adjacent bolt hole used by the previous bailhead quick-release pin.

In at least one embodiment, the method also includes utilizing a retaining clip configured for placement over the threaded screw and configured to hold the hand knob to the motorcycle saddlebag when the motorcycle saddlebag is removed from the motorcycle.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which:

FIG. 4A is a top planar view of the lock washer utilized in the theft deterrent device depicted in FIGS. 1A-1C;

FIG. 4B is a side view of the lock washer utilized in the theft deterrent device depicted in FIGS. 1A-1C;

FIG. 4C is a first side perspective view of the lock washer utilized in the theft deterrent device depicted in FIGS. 1A-1C;

FIG. 4D is a second side perspective view of the lock washer utilized in the theft deterrent device depicted in FIGS. 1A-1C;

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. In addition, the terminology used herein is for the purpose of description and not of limitation.

In various exemplary embodiments, the technology described herein provides an improved apparatus and mounting and theft deterrent system for a motorcycle saddlebag. Additionally, this technology relates to a method for retrofitting a motorcycle with the mounting hardware apparatus and theft deterrent system.

Referring now to the Figures, a mounting hardware and theft deterrent device 10 is shown. The theft deterrent device 10 includes a hand knob 12. The hand knob 12 is best illustrated in FIGS. 2A to 2E. The hand knob 12 provides an easy way for the user to install and/or uninstall the theft deterrent device 10 without the need for additional tools. In at least one embodiment of the theft deterrent device 10, the hand knob 12 comprises a fluted hand knob, as depicted, for example, in FIGS. 1A to 1C.

Figure 1A:
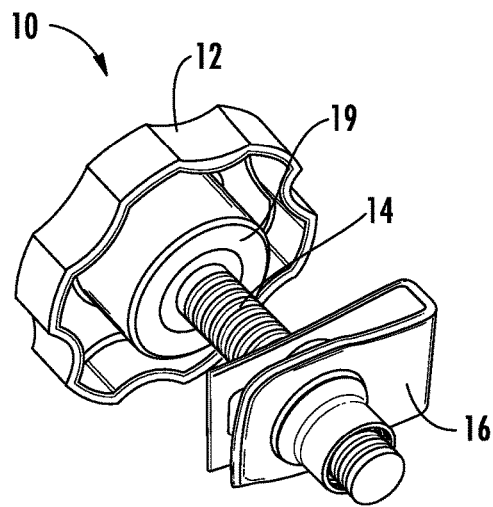
FIGS. 1A-1C are front perspective views of mounting hardware and a theft deterrent device, according to an embodiment of the technology described herein.
Figure 1B:
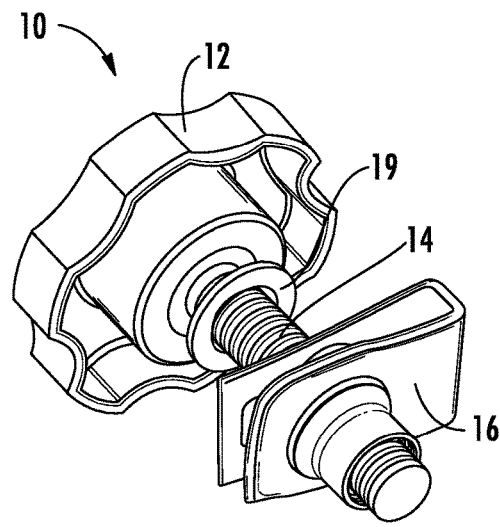
Figure 1C:
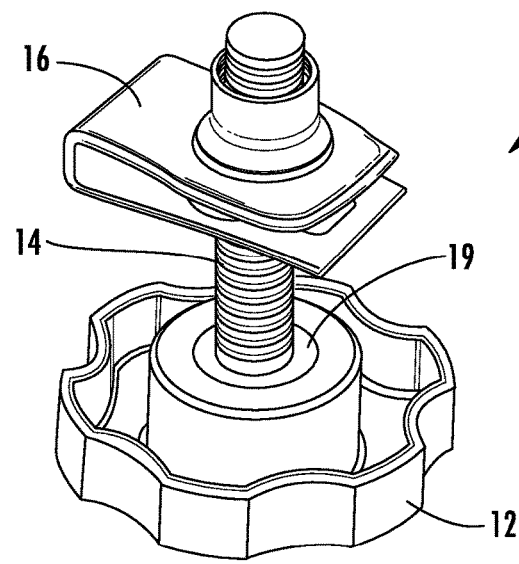
Figure 2A:
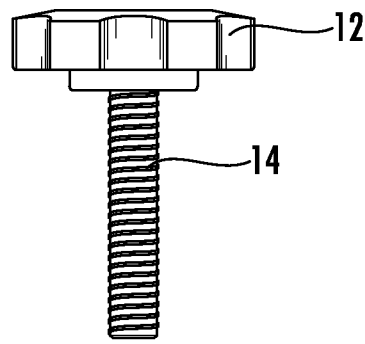
FIG. 2A is a planar view of the fluted knob fitted with a threaded metal stud utilized in the theft deterrent device depicted in FIGS. 1A-1C.
Figure 2B:
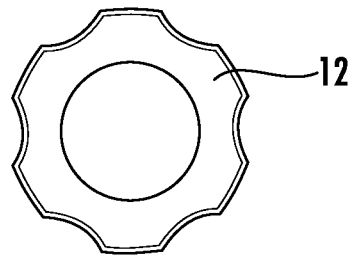
FIG. 2B is a top view of the fluted knob fitted with a threaded metal stud utilized in the theft deterrent device depicted in FIGS. 1A-1C.
Figure 2C:
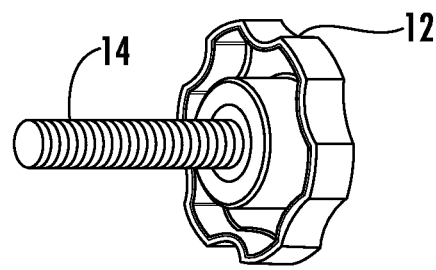
FIG. 2C is a side perspective view of the fluted knob fitted with a threaded metal stud utilized in the theft deterrent device depicted in FIGS. 1A-1C.
Figure 2D:
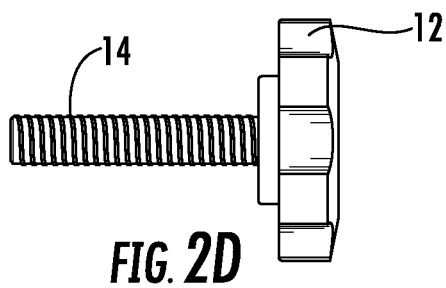
FIG. 2D is a side planar view of the fluted knob fitted with a threaded metal stud utilized in the theft deterrent device depicted in FIGS. 1A-1C.
Figure 2E:
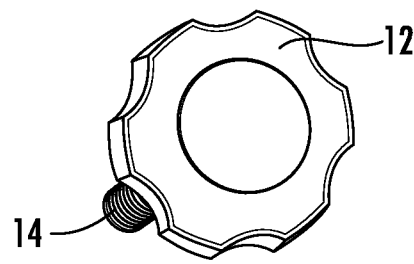
FIG. 2E is a top perspective view of the fluted knob fitted with a threaded metal stud utilized in the theft deterrent device depicted in FIGS. 1A-1C.
Figure 3A:
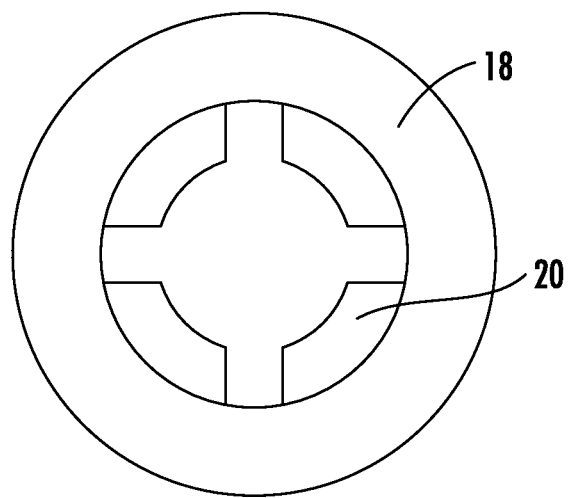
FIG. 3A is a top planar view of the retaining washer utilized in the theft deterrent device depicted in FIGS. 1A-1C, to hold the theft deterrent device to the saddlebag when removed from the motorcycle.
Figure 3B:
FIG. 3B is a side view of the retaining washer utilized in the theft deterrent device depicted in FIGS. 1A-1C, to hold the theft deterrent device to the saddlebag when removed from the motorcycle.
Figure 3C:
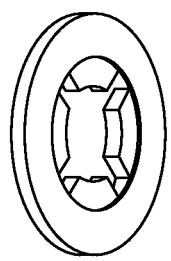
FIG. 3C is a first side perspective view of the retaining washer utilized in the theft deterrent device depicted in FIGS. 1A-1C, to hold the theft deterrent device to the saddlebag when removed from the motorcycle.
Figure 3D:
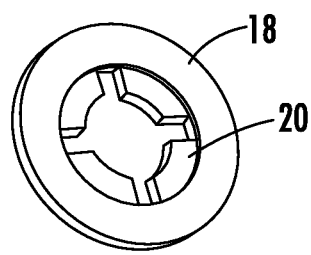
FIG. 3D is a second side perspective view of the retaining washer utilized in the theft deterrent device depicted in FIGS. 1A-1C, to hold the theft deterrent device to the saddlebag when removed from the motorcycle.

In at least one embodiment, the hand knob 12 includes multiple fingers grips, as depicted, for example, in FIGS. 1A to 1C. The finger grips further provide an easy way for the user to install and/or uninstall the theft deterrent device 10 without the need for additional tools.

In at least one embodiment, the hand knob 12 includes a receptacle for the threaded screw 14 on a backside of the hand knob 12. As depicted in FIGS. 1A to 1C, the threaded screw 14 is already mounted within the receptacle.

In at least one embodiment, the receptacle is 5/16 of an inch in diameter. This dimension is configured to accommodate a threaded screw 14 having a 5/16 of an inch in diameter. In at least one embodiment, the hand knob 12 is plastic. As will be apparent to a person having skill in this art, and upon reading this disclosure, alternative sizes are utilized in various embodiments.

In at least one embodiment, the hand knobs 12 are press-lock flowerette knobs.

In at least one embodiment, the hand knobs 12 are color coded so that a multiplicity can be sold as a package and be distinct by color.

The theft deterrent device 10 includes a threaded screw 14. The threaded screw 14 is fixedly coupled to an underside surface of the hand knob 12.

In at least one embodiment of the theft deterrent device 10, the threaded screw 14 is a socket head cap screw.

In at least one embodiment, the threaded screw 14 is a stud having a length of 1.25 inches. This length is to accommodate certain known systems and allow for an easy retrofit process with the theft deterrent device.

In at least one embodiment, the threaded screw 14 is a stud having a length of 1.5 inches. This length is to accommodate certain known systems and allow for an easy retrofit process with the theft deterrent device. As will be apparent to a person having skill in this art, and upon reading this disclosure, alternative sizes are utilized in various embodiments.

In at least one embodiment, the threaded screw 14 is a black-oxide alloy steel having a strength of stronger than Grade 8 steel screws. In at least one embodiment, the threaded screw 14 is stainless steel.

Figure 5A:
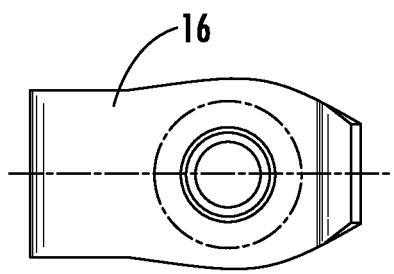
FIG. 5A is a top planar view of the multi-threaded U-nut utilized in the theft deterrent device depicted in FIGS. 1A-1C.
Figure 5B:
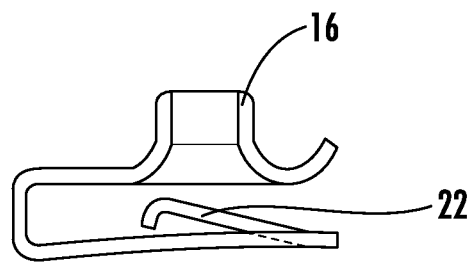
FIG. 5B is a side planar view of the multi-threaded U-nut utilized in the theft deterrent device depicted in FIGS. 1A-1C.
Figure 5C:
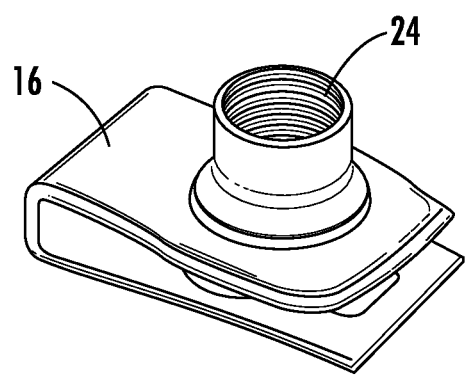
FIG. 5C is a perspective view of the multi-threaded U-nut utilized in the theft deterrent device depicted in FIGS. 1A-1C.

In at least one embodiment, the threaded screw 14 has a minimum tensile strength of 170,000 psi and a minimum Rockwell hardness of C37. Length is measured from under the head. Inch screws have a Class 3A thread fit. They meet ASTM A574. Black oxide screws have been heat-treated for hardness, which results in a dark surface color The theft deterrent device 10 includes a U-clip 16. The U-clip 16 is best illustrated in FIGS. 5A to 5C. The U-clip 16, or U-nut as it is also called, is a tapped-hole, no-slip clip-on nut.

The U-clip 16 is configured to replace a stock retaining clip on a motorcycle frame. The U-clip 16 also is configured for placement on the motorcycle frame to receive the threaded screw 14 coupled to the hand knob 12, in threaded aperture 24 and retention clip 22, and thereby to secure a motorcycle saddlebag to the motorcycle.

In at least one embodiment of the theft deterrent device 10, the U-clip 16 is spring steel and has a diameter of 5/16 inches. Additionally, the U-clip 16 can be configured to receive a threaded screw having a diameter of 5/16 inches. As will be apparent to a person having skill in this art, and upon reading this disclosure, alternative sizes are utilized in various embodiments.

Threaded screws 14 pass through both the top and bottom of these one-piece reusable nuts 16, so the nuts do not slip or turn as they are tightened down.

Each U-clip 16 is made from spring steel and has a black-phosphate finish. Each U-clip 16 has a minimum Rockwell hardness of C40. Inch sizes for machine screws have a Class 2B thread fit. Tapped hole nuts 16 are multiple-thread extruded nuts that are also known as fold-over nuts. They provide a tapped hole 24 for high-strength fastening of sheet-metal components and other applications.

The theft deterrent device 10 includes a lock washer 19. The lock washer 19 is specifically detailed in FIGS. 4A to 4D. The lock washer 19 is configured for placement over the threaded screw coupled to the hand knob before the threaded screw is inserted into the U-clip.

In at least one embodiment of the theft deterrent device 10, the lock washer 19 is a split lock washer and has a diameter of 5/16 inches. Additionally, the lock washer 19 is configured to receive a threaded screw having a diameter of 5/16 inches. In at least one embodiment the lock washer 19 is stainless steel. As will be apparent to a person having skill in this art, and upon reading this disclosure, alternative sizes are utilized in various embodiments.

Lock washer 19 size (diameter) is the size bolt that the washer is used with. Thus a 5/16" washer fits a 5/16" bolt. Split lock washers prevent bolted joints from loosening under small amounts of vibration. As a screw is tightened, these washers are forced into a flat shape, which adds tension to the joint for a tight hold.

The hand knob 12, threaded screw 14 fixedly coupled to an underside surface of the hand knob 12, U-clip 16, and lock washer 19 collectively form the theft deterrent device 10.

In at least one embodiment, the theft deterrent device 10 is configured for utilization to secure a motorcycle saddlebag to a motorcycle frame without a need for any additional installation tools. Devices known in the art requires one or more tools to install and/or uninstall and are known to be cumbersome.

In at least one embodiment, the theft deterrent device 10 all includes a retaining clip 18, or what may also be called a retaining washer. The retaining clip 18 is specifically detailed in FIGS. 3A to 3D. The retaining clip 18 is configured for placement over the threaded screw 14. The retaining clip 18 is configured to hold the hand knob 12 to the motorcycle saddlebag when the motorcycle saddlebag is removed from the motorcycle.

In at least one embodiment of the theft deterrent device 10, the retaining clip 18 is spring steel and has a diameter of 5/16 inches. Additionally, the retaining clip 18 can be configured to receive a threaded screw having a diameter of 5/16 inches. In at least one embodiment, the retaining clip 18 is stainless steel. In at least one embodiment the retaining clip 18 includes prongs 20 to aid in retention.

In yet another exemplary embodiment, technology described herein provides a motorcycle saddlebag theft deterrent system. The motorcycle saddlebag theft deterrent system includes: a motorcycle having a motorcycle frame 32 upon which motorcycle saddlebags are attached; a hand knob 12; a threaded screw 14 fixedly coupled to an underside surface of the hand knob 12; a U-clip 16 configured for placement on the motorcycle frame to receive the threaded screw coupled to the hand knob and thereby to secure a motorcycle saddlebag to the motorcycle; and a lock washer 19 configured for placement over the threaded screw 14 coupled to the hand knob 12 before the threaded screw 14 is inserted into the U-clip 16.

In yet another exemplary embodiment, the technology described herein provides a method for securing a motorcycle saddlebag to a motorcycle by retrofitting the motorcycle with a theft deterrent device.

The method includes: utilizing a theft deterrent device 10 comprising: a hand knob 12; a threaded screw 14 fixedly coupled to an underside surface of the hand knob 12; a U-clip 16 configured to replace a stock retaining clip 26 on a motorcycle frame and configured for placement on the motorcycle frame to receive the threaded screw coupled to the hand knob and thereby to secure a motorcycle saddlebag to the motorcycle; and a lock washer 19 configured for placement over the threaded screw 14 coupled to the hand knob 12 before the threaded screw 14 is inserted into the U-clip 16. The theft deterrent device 10 utilized in depicted in FIGS. 1A to 5C.

The method includes opening a saddlebag lid. Once opened the operator locates the saddlebag quick release pins (FIG. 17, provisional application).

The method includes removing any existing saddlebag quick-release pins (FIG. 17, provisional application).

The method includes removing a saddlebag. All saddlebags are removed from the motorcycle.

Figure 6:
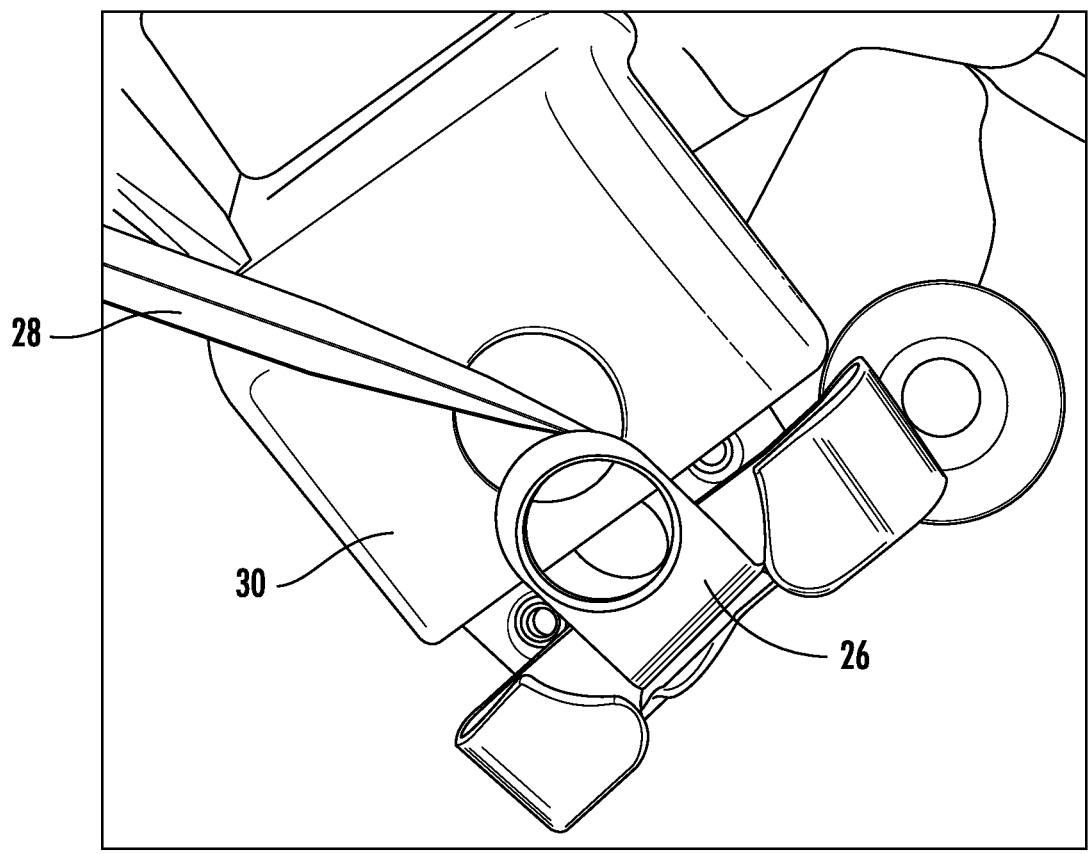
FIG. 6 is a perspective view illustrating a method step in the removal of a stock retaining clip on an existing motorcycle saddlebag system, when retrofitting the motorcycle with the theft deterrent device, according to an embodiment of the technology described herein.
Figure 7:
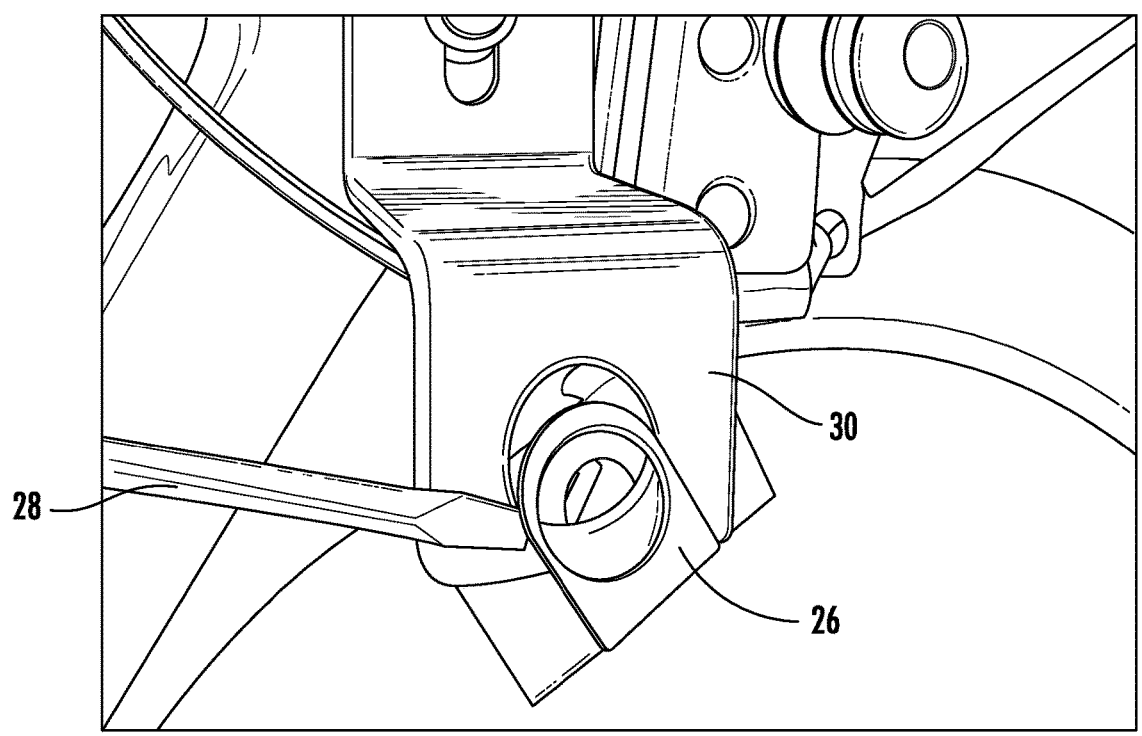
FIG. 7 is a perspective view illustrating a method step in the removal of a stock retaining clip on an existing motorcycle saddlebag system, when retrofitting the motorcycle with the theft deterrent device, according to an embodiment of the technology described herein.

The method includes removing any existing stock-retaining clips 26. This is best depicted in FIGS. 6 and 7, each illustrating different motorcycle models but the same general process for removal of the stock-retaining clips 26. Using tool 28, such as a flathead screwdriver, an operator inserted the tool 28 between frame segment 30 and the stock-retaining clips 26. The stock-retaining clips 26 slide off once push by the tool 28.

Figure 8:
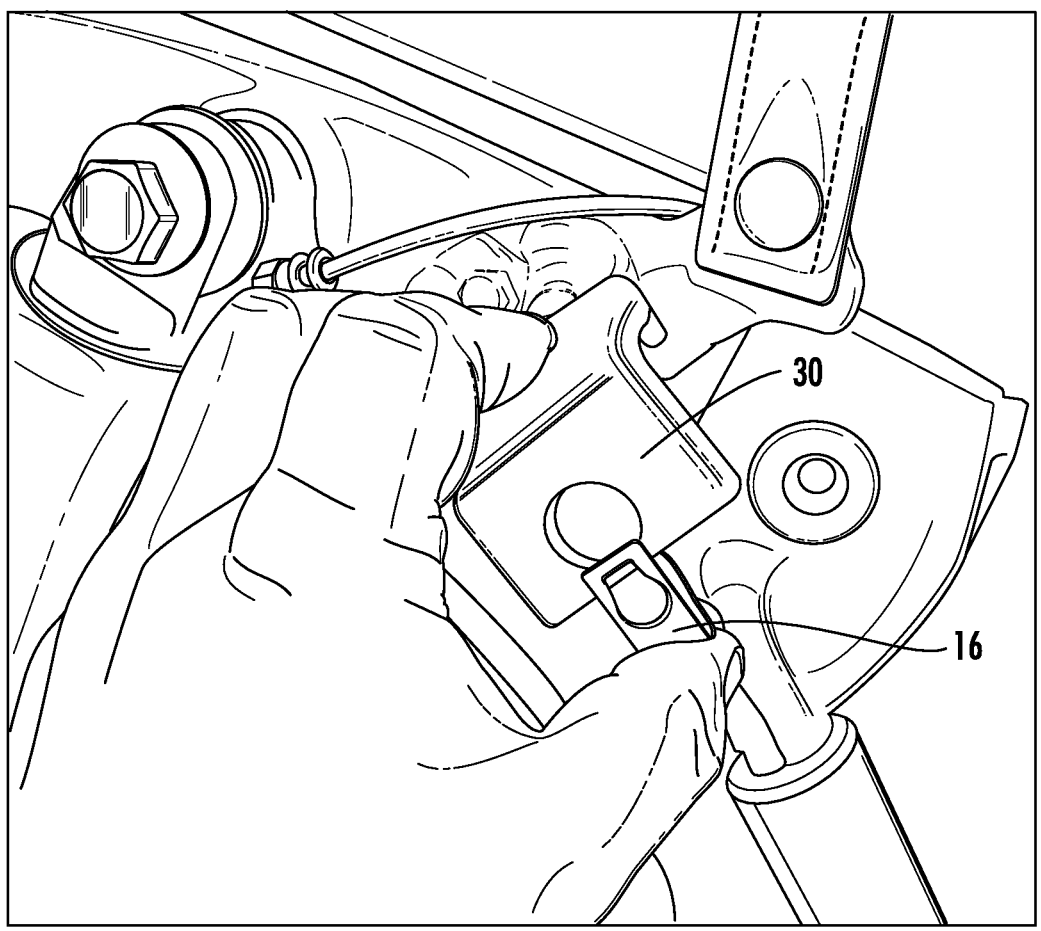
FIG. 8 is a perspective view illustrating a method step in the insertion of a U-nut of the theft deterrent device, when retrofitting the motorcycle with the theft deterrent device, according to an embodiment of the technology described herein.
Figure 9:
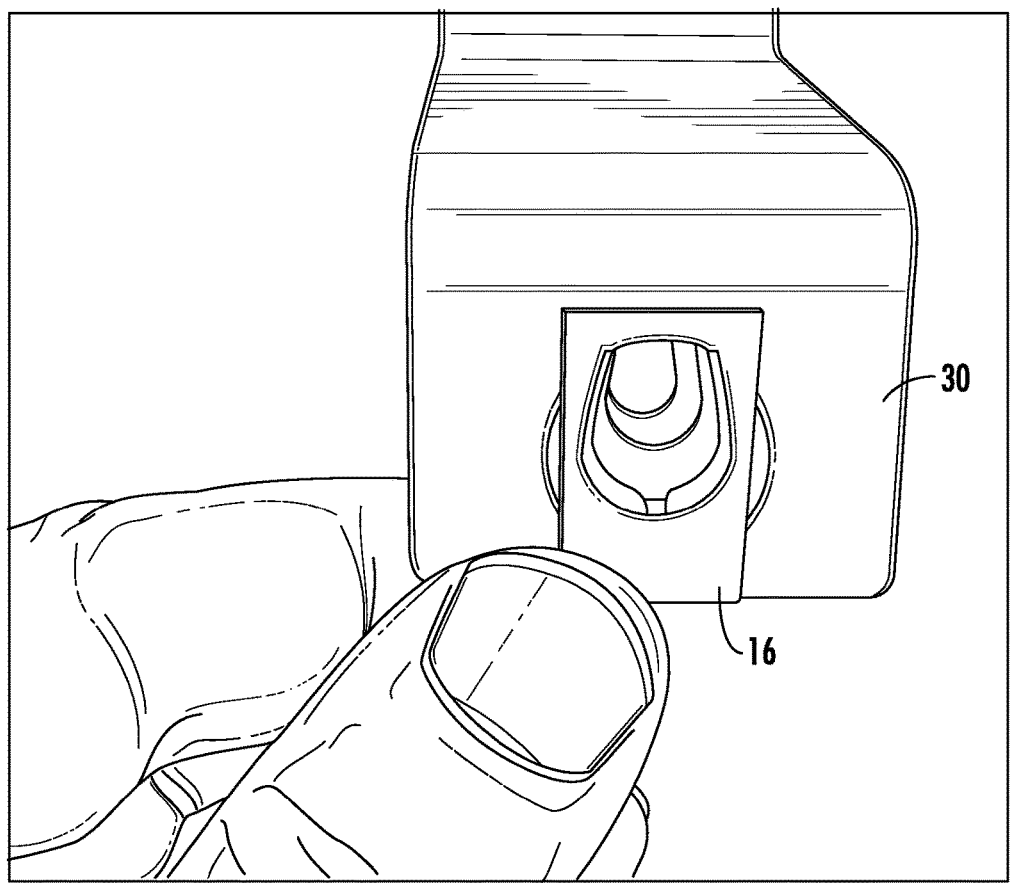
FIG. 9 is a perspective view illustrating a method step in the insertion of a U-nut of the theft deterrent device, when retrofitting the motorcycle with the theft deterrent device, according to an embodiment of the technology described herein.

The method includes installing a U-clip 16 on a motorcycle frame where the stock retaining clip was previously located. This is best depicted in FIGS. 8 and 9, each illustrating different motorcycle models but the same general process for installing the U-clip 16.

The method includes repeating the above method steps for each removed stock retaining clip.

The method includes reinstalling the saddle bag.

The method includes sliding a lock washer 19 on the threaded screw 14 fixedly coupled to an underside surface of the hand knob 12.

The method includes sliding an original flat washer from the original bailhead quick release pin (FIGS. 17 and 18, provisional application) on the threaded screw 14 fixedly coupled to an underside surface of the hand knob 12.

The method includes inserting the threaded screw 12 through a rubber grommet and into the U-clip 16.

The method includes tightening the hand knob 12.

The method includes repeating the above steps for any adjacent bolt hole used by the previous bailhead quick-release pin.

In at least one embodiment, the method includes utilizing a retaining clip configured for placement over the threaded screw and configured to hold the hand knob to the motorcycle saddlebag when the motorcycle saddlebag is removed from the motorcycle.

Figure 10:
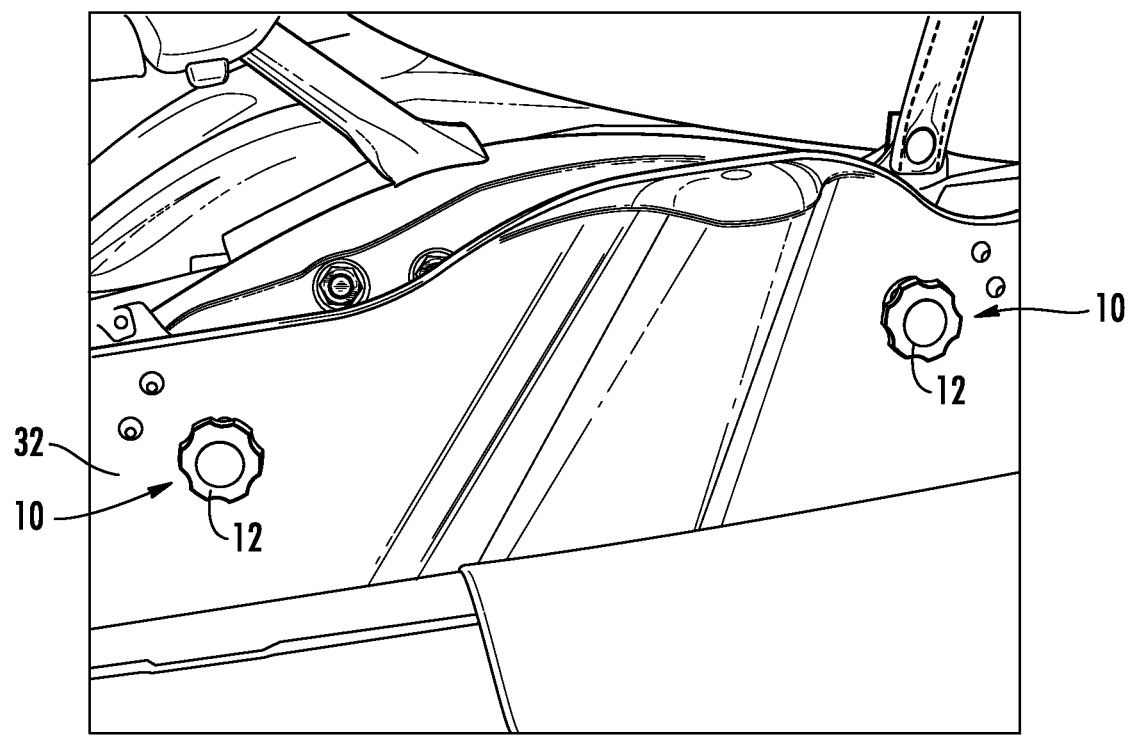
FIG. 10 is a perspective view illustrating the installation of a pair of theft deterrent devices to hold a saddlebag to a motorcycle, according to an embodiment of the technology described herein.

FIG. 10 illustrates a fully installed theft deterrent device 10 installed via the above disclosed method steps. This saddle bag is secured with a pair of theft deterrent devices 10.

Figure 11:
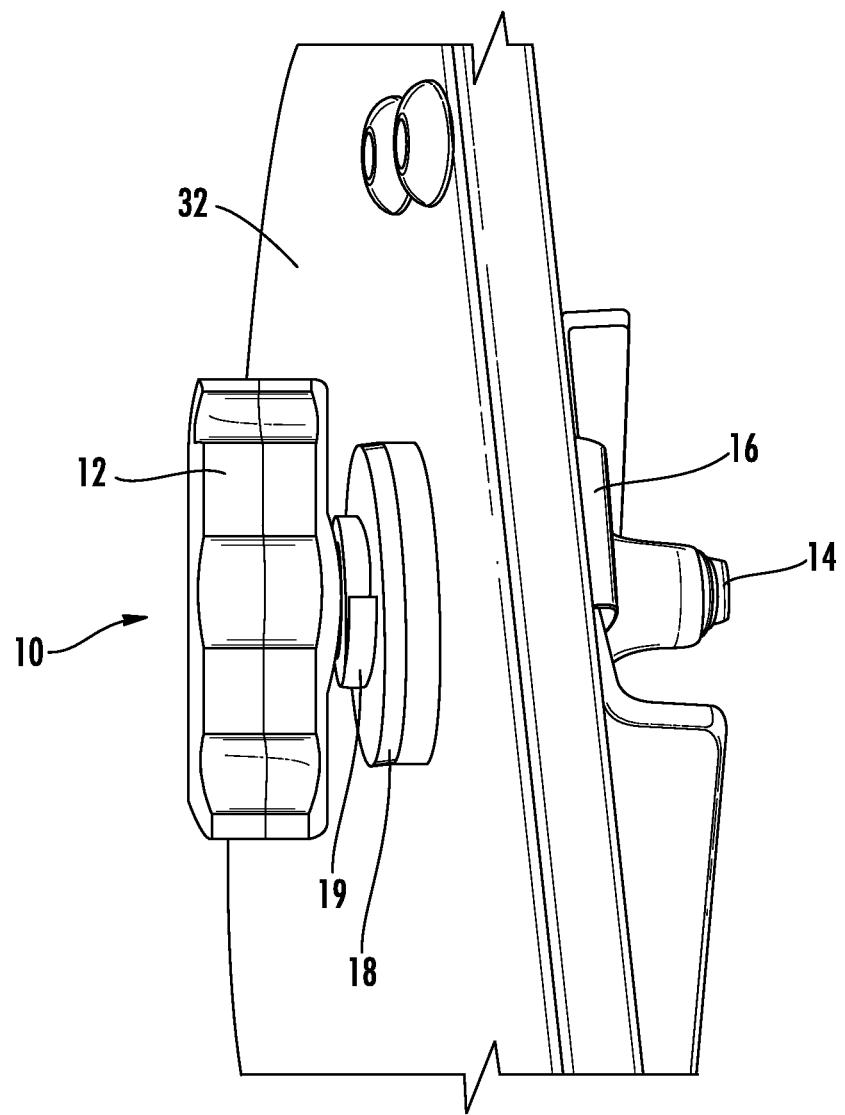
FIG. 11 is a perspective view illustrating the completed installation of a theft deterrent device to hold a saddlebag to a motorcycle, from a view looking down on the saddlebag, according to an embodiment of the technology described herein.

FIG. 11 illustrates a fully installed theft deterrent device 10 installed via the above disclosed method steps. This view is looking down on the saddlebag.

Figure 12:
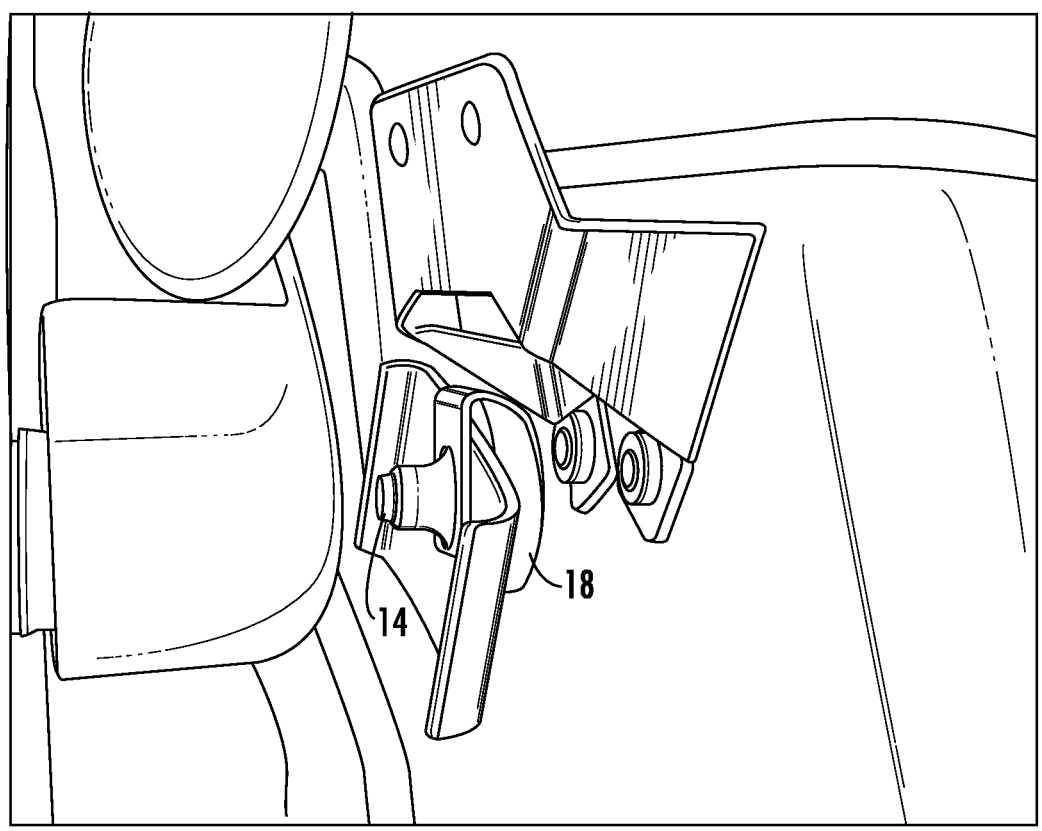
FIG. 12 is a perspective view illustrating the completed installation of a theft deterrent device to hold a saddlebag to a motorcycle, from a view from the back of the motorcycle and saddlebag, according to an embodiment of the technology described herein.

FIG. 12 illustrates a fully installed theft deterrent device 10 installed via the above disclosed method steps. This view is looking from the back of the motorcycle and attached saddlebag.

Advantageously, the theft deterrent device 10 idea makes fiberglass and soft leather saddlebags more secure than with the stock bailhead and receptacle quick/twist release systems known in the art.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A theft deterrent device comprising:
   a fluted hand knob comprising a plurality of curved flutes disposed around its circumference;
   a plurality of finger grip areas disposed within the fluted hand knob and configured to provide an easy way for the user to install and/or uninstall the theft deterrent device without the need for additional tools;
   a threaded screw fixedly coupled to an underside surface of the hand knob;
   a U-clip configured to replace a stock retaining clip on a motorcycle frame and configured for placement on the motorcycle frame to receive the threaded screw coupled to the hand knob and thereby to secure a motorcycle saddlebag to the motorcycle; and
   a split lock washer configured for placement over the threaded screw coupled to the hand knob before the threaded screw is inserted into the U-clip to add tension for a tight hold and configured to prevent the threaded screw from loosening; and
   wherein the hand knob, threaded screw fixedly coupled to an underside surface of the hand knob, U-clip, and lock washer collectively form the theft deterrent device.

2. The theft deterrent device of claim 1, further comprising:
   a retaining clip configured for placement over the threaded screw and configured to hold the hand knob to the motorcycle saddlebag when the motorcycle saddlebag is removed from the motorcycle.

3. The theft deterrent device of claim 1, wherein the theft deterrent device is configured for utilization to secure a motorcycle saddlebag to a motorcycle frame without a need for any additional installation tools.

4. The theft deterrent device of claim 1, wherein the hand knob comprises a fluted hand knob.

5. The theft deterrent device of claim 1, wherein the hand knob comprises a plurality of fingers grips.

6. The theft deterrent device of claim 1, wherein the hand knob comprises a receptacle for the threaded screw on a backside of the hand knob.

7. The theft deterrent device of claim 1, wherein the hand knob comprises a receptacle for the threaded screw on a backside of the hand knob; and wherein the receptacle is $5/16$ of an inch in diameter.

8. The theft deterrent device of claim 1, wherein the threaded screw comprises a socket head cap screw.

9. The theft deterrent device of claim 1, wherein the threaded screw comprises a stud having a length of 1.25 inches.

10. The theft deterrent device of claim 1, wherein the threaded screw comprises a stud having a length of 1.5 inches.

11. The theft deterrent device of claim 1, wherein the threaded screw comprises a black-oxide alloy steel having a strength of stronger than Grade 8 steel screws.

12. The theft deterrent device of claim 1, wherein the U-clip comprises spring steel and a diameter of $5/16$ inches and configured to receive a threaded screw having a diameter of $5/16$ inches.

13. The theft deterrent device of claim 1, wherein the lock washer comprises a split lock washer and a diameter of $5/16$ inches and configured to receive a threaded screw having a diameter of $5/16$ inches.

14. A motorcycle saddlebag theft deterrent system comprising:
   a motorcycle having a motorcycle frame upon which motorcycle saddlebags are attached;
   a fluted hand knob comprising a plurality of curved flutes disposed around its circumference;
   a plurality of finger grip areas disposed within the fluted hand knob and configured to provide an easy way for the user to install and/or uninstall the theft deterrent device without the need for additional tools;
   a threaded screw fixedly coupled to an underside surface of the hand knob;
   a U-clip configured for placement on the motorcycle frame to receive the threaded screw coupled to the hand knob and thereby to secure a motorcycle saddlebag to the motorcycle; and
   a split lock washer configured for placement over the threaded screw coupled to the hand knob before the threaded screw is inserted into the U-clip to add tension for a tight hold and configured to prevent the threaded screw from loosening.

15. The motorcycle saddlebag theft deterrent system of claim 14, further comprising:
   a retaining clip configured for placement over the threaded screw and configured to hold the hand knob to the motorcycle saddlebag when the motorcycle saddlebag is removed from the motorcycle.

16. The motorcycle saddlebag theft deterrent system of claim 14, wherein the hand knob comprises a fluted hand knob, a plurality of fingers grips, and a receptacle for the threaded screw on a backside of the hand knob.

17. The motorcycle saddlebag theft deterrent system of claim 14, wherein the threaded screw comprises a socket head cap screw; and wherein the threaded screw comprises a stud having a length within the range of 1.25 inches to 1.5 inches.

18. The motorcycle saddlebag theft deterrent system of claim 14, wherein the U-clip comprises spring steel and a diameter of 5/16 inches and configured to receive a threaded screw having a diameter of 5/16 inches; and wherein the lock washer comprises a split lock washer and a diameter of 5/16 inches and configured to receive a threaded screw having a diameter of 5/16 inches.

19. A method for securing a motorcycle saddlebag to a motorcycle by retrofitting the motorcycle with a theft deterrent device, the method comprising:
   utilizing a theft deterrent device comprising:
      a hand knob;
      a threaded screw fixedly coupled to an underside surface of the hand knob;
      a U-clip configured to replace a stock retaining clip on a motorcycle frame and configured for placement on the motorcycle frame to receive the threaded screw coupled to the hand knob and thereby to secure a motorcycle saddlebag to the motorcycle; and
      a lock washer configured for placement over the threaded screw coupled to the hand knob before the threaded screw is inserted into the U-clip;
   opening a saddlebag lid;
   removing any existing saddlebag quick-release pins;
   removing a saddlebag;
   removing any existing stock-retaining clips;
   installing a U-clip on a motorcycle frame where the stock retaining clip was previously located;
   repeating the above method steps for each removed stock retaining clip;
   reinstalling the saddle bag;
   sliding a lock washer on the threaded screw fixedly coupled to an underside surface of the hand knob;
   sliding an original flat washer from the original bailhead quick release pin on the threaded screw fixedly coupled to an underside surface of the hand knob;
   inserting the threaded screw through a rubber grommet and into the U-clip;
   tightening the hand knob; and
   repeating the above steps for any adjacent bolt hole used by the previous bailhead quick-release pin.

20. The method of claim 19, further comprising:
   utilizing a retaining clip configured for placement over the threaded screw and configured to hold the hand knob to the motorcycle saddlebag when the motorcycle saddlebag is removed from the motorcycle.

* * * * *